United States Patent
Sano et al.

(10) Patent No.: US 10,658,893 B2
(45) Date of Patent: May 19, 2020

(54) ROTARY ELECTRIC-MACHINE ROTOR

(71) Applicant: TOYOTA JIDOSHA KABUSHIKI KAISHA, Toyota-shi, Aichi-ken (JP)

(72) Inventors: Shinya Sano, Toyota (JP); Shingo Fubuki, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 173 days.

(21) Appl. No.: 15/858,819

(22) Filed: Dec. 29, 2017

(65) Prior Publication Data

US 2018/0198334 A1 Jul. 12, 2018

(30) Foreign Application Priority Data

Jan. 11, 2017 (JP) ................................ 2017-002660

(51) Int. Cl.
  *H02K 1/27* (2006.01)
  *H02K 1/02* (2006.01)
  *H02K 1/28* (2006.01)

(52) U.S. Cl.
  CPC .............. *H02K 1/28* (2013.01); *H02K 1/276* (2013.01); *H02K 1/2766* (2013.01); *H02K 1/02* (2013.01)

(58) Field of Classification Search
  CPC ............ H02K 1/27; H02K 1/276; H02K 1/28
  See application file for complete search history.

(56) References Cited

U.S. PATENT DOCUMENTS

| 5,650,680 A * | 7/1997 | Chula ................... H02K 1/276 310/111 |
|---|---|---|
| 5,881,448 A | 3/1999 | Molnar |
| 6,919,663 B2 | 7/2005 | Iles-Klumpner |
| 7,646,125 B2 * | 1/2010 | Okamoto ............... H02K 1/276 310/156.53 |
| 8,063,530 B2 * | 11/2011 | Podack .................. H02K 1/276 310/156.08 |
| 8,179,010 B2 * | 5/2012 | Ogami ................. H02K 1/2766 29/598 |
| 8,692,432 B2 * | 4/2014 | Kingrey ................... H02K 1/27 310/156.53 |
| 10,361,600 B2 * | 7/2019 | Watanabe ............. H02K 1/276 |
| 2010/0026127 A1 | 2/2010 | Mizutani et al. |
| 2012/0139382 A1 | 6/2012 | Yamagishi et al. |

(Continued)

FOREIGN PATENT DOCUMENTS

| CN | 101657950 A | 2/2010 |
|---|---|---|
| DE | 10 2016 210 417 A1 | 12/2016 |

(Continued)

*Primary Examiner* — Burton S Mullins
(74) *Attorney, Agent, or Firm* — Sughrue Mion, PLLC

(57) ABSTRACT

A rotary electric-machine rotor includes: a rotor core made of magnetic material, the rotor core having magnet holes; magnets disposed in the magnet holes; resin portions disposed in at least part of gaps between the magnet holes and the magnets, the resin portions extending in the axial direction; and end plates disposed adjacent to end surfaces in an axial direction of the rotor core. The end plates are members made of magnetic material. The end plates cover end surfaces of the magnets in the axial direction and end surfaces of the resin portions in the axial direction, and each of the end plates having at least one holes disposed in a position that faces at least one part of the end surfaces of the magnets.

8 Claims, 4 Drawing Sheets

(56) References Cited

U.S. PATENT DOCUMENTS

2014/0077652 A1 3/2014 Yamagishi et al.
2015/0061445 A1 3/2015 Ishimatsu et al.
2016/0380493 A1 12/2016 Matsumoto et al.

FOREIGN PATENT DOCUMENTS

| EP | 2136454 A1 | 12/2009 |
|----|------------|---------|
| JP | 2005-102461 A | 4/2005 |
| JP | 2008-263722 A | 10/2008 |
| JP | 2010-207021 A | 9/2010 |
| JP | 2013-055775 A | 3/2013 |
| JP | 2015-226368 A | 12/2015 |

* cited by examiner

ROTARY ELECTRIC-MACHINE ROTOR

INCORPORATION BY REFERENCE

The disclosure of Japanese Patent Application No. 2017-002660 filed on Jan. 11, 2017 including the specification, drawings and abstract is incorporated herein by reference in its entirety.

BACKGROUND

1. Technical Field

The present disclosure relates to a rotary electric-machine rotor including a rotor core, magnets inserted in magnet holes of the rotor core, and end plates.

2. Description of Related Art

Conventionally, in rotary electric-machine rotors included in rotary electric machines, there has been known a configuration that magnets are inserted in magnet holes of rotor cores so as to fix the magnets to the rotor cores.

Japanese Patent Application Publication No. 2013-55775 (JP 2013-55775 A) discloses a configuration that multiple electromagnetic steel plates are stacked so as to form a rotor core, and magnets that are permanent magnets are inserted in holes (magnet holes) in the axial direction formed at multiple positions of the rotor core. In the above configuration, end plates are disposed at both axial ends of the rotor core. The end plates have a function to prevent the magnets from coming out in the axial direction from the rotor core. The end plates are formed by non-magnetic material, such as aluminum and an aluminum alloy. JP 2013-55775 A describes that the end plates are formed by non-magnetic material, to thereby effectively suppress magnetic-flux leakage at the axial end portions of the magnets.

SUMMARY

As the configuration described in JP 2013-55775 A, when non-magnetic material is used for the end plates, increase in cost is likely to be caused, compared with the case in which the end plates are formed by magnetic mineral. On the other hand, when the end plates are formed simply by magnetic material, magnetic-flux leakage, as a phenomenon that magnetic-flux coming from the magnets does not flow toward the stator, but toward the end plates, is likely to occur. This magnetic-flux leakage might cause magnetic-flux short-circuit that magnetic-flux coming out from the magnets is short-circuited through the end plates. Occurrence of the magnetic-flux leakage and the magnetic-flux short-circuit is not preferable because the magnetic-flux contributing to torque of the rotary electric machine is reduced, and increase in loss of the torque might be caused. If the magnets are fixed in the holes of the rotor core by resin portions, it is necessary to suppress coming out of the magnets and coming out of the resin due to cracking of the resin portions by the end plates.

A rotary electric-machine rotor of the present disclosure, in a configuration that magnets are inserted in magnet holes of a rotor core, eliminates necessity to use non-magnetic material for end plates, while coping with both suppression of magnetic-flux leakage of the magnets and suppression of coming out of the magnets and resin.

As one aspect of the present disclosure is a rotary electric-machine rotor. The rotary electric-machine rotor includes: a rotor core made of magnetic material, the rotor core having magnet holes extending in an axial direction of the rotary electric-machine rotor; magnets disposed in the magnet holes; resin portions disposed in at least part of gaps between the magnet holes and the magnets, the resin portions extending in the axial direction; and end plates disposed adjacent to end surfaces in an axial direction of the rotor core. The end plates are members made of magnetic material. The end plates cover end surfaces of the magnets in the axial direction and end surfaces of the resin portions in the axial direction, and each of the end plates having at least one holes disposed in a position that faces at least one part of the end surfaces of the magnets.

According to the above configuration, the hole is formed in each end plate made of magnetic material, to thereby suppress magnetic-flux leakage of the magnets. In addition, the end plates cover the axial end surfaces of the magnets and the axial end surfaces of the resin portions. Through this, it becomes unnecessary to use non-magnetic material for the end plates, and it is possible to cope with both suppression of the magnetic-flux leakages of the magnets and suppression of coming out of the magnets and the resin.

In the rotary electric-machine rotor of the present disclosure, each of the end plates and the rotor core may be made of the same kind of magnetic material, and have the same thickness.

According to the above configuration, both the end plates and the first steel plates of the rotor core can be formed by punching a steel sheet material of the same material and having the same thickness. Through this, by reducing material cost and the number of process, it is possible to promote reduction of manufacturing cost of the rotary electric-machine rotor.

In the rotary electric-machine rotor of the present disclosure, at least one of the holes may be a plurality of holes, each of the end plates may have the plurality of holes disposed in an end surface of each of the end plates facing the end surface of the magnets.

According to the above configuration, it is possible to increase a proportion of the holes per unit area of the end plates, and reduce the size of each hole, to thereby increase a total number of the holes. Accordingly, it is possible to cope with both suppression of magnetic-flux leakage and suppression of coming out of the magnets at a higher degree.

In the rotary electric-machine rotor of the present disclosure, each end plate may have a plurality of second holes disposed in the end surface of each of the end plates facing an end surface of the resin portions in the axial direction.

According to the above configuration, it is possible to increase a proportion of the second holes per unit area of the end plates, and reduce the size of each second hole, to thereby increase a total number of the second holes. Accordingly, it is possible to cope with both suppression of leakage magnetic-flux flowing through the portions of each end plate facing the resin portions and suppression of coming out of the resin due to cracking of the resin portions.

In the rotary electric-machine rotor of the present disclosure, a maximum inner length of each of the plurality of second holes may be smaller than a maximum inner length of each of the plurality of holes.

According to the above configuration, it is possible to suppress coming out of the resin due to cracking of the resin portions, suppress the number of hole-punches for the leakage magnetic-flux suppressing holes, and also suppress magnetic-flux leakage.

In the rotary electric-machine rotor of the present disclosure, a distance between the holes adjacent to each other may be greater than a distance between the second holes adjacent to each other.

According to the above configuration, it is possible to increase strength in the portions of each end plate that face the magnets, the portions being likely to be pushed by the magnets, and also to enhance effect to suppress magnetic-flux leakage in the portions that face the resin portions, the portions being not required to have a high strength.

In the rotary electric-machine rotor of the present disclosure, the plurality of holes may be a plurality of pin-holes, each of the plurality of pin-holes may have a round shape, each the end plates may have a plurality of pin-hole sets provided in a rectangular region facing the end surfaces of the magnets, each of the pin-hole sets may include the plurality of the pin-holes arranged on a straight line in a longitudinal direction of the rectangular region, and positions of the pin holes in any one of the pin-hole sets may be offset in the longitudinal direction from positions of the pin-holes in an adjacent one of the pin-hole sets.

According to the above configuration, it is possible to easily reduce the size of each pin-hole, and reduce the distance between the two adjacent pin-hole sets. Hence, when the pin-holes are formed by punching, the magnetic characteristic between the pin-holes can easily be deteriorated. In addition, in each end plate, the paths of the magnetic-flux leakage passing through between the multiple pin-holes are formed in a non-straight linear state, to thereby increase the path lengths. Accordingly, it is possible to suppress occurrence of the magnetic-flux short-circuit via the end plates, and thus it is possible to suppress decrease of torque and increase in loss of the torque of the rotary electric machine.

In the rotary electric-machine rotor of the present disclosure, two magnet holes adjacent to each other a circumferential direction may be arranged in a V-shape such that a distance between the two magnet holes in the circumferential direction increases outward in a radial direction, the rotor core may include an intermediate bridge between end portions in a circumferential direction of the two magnet holes corresponding to each set of magnets, and two outer circumferential bridges between respective radially outer end portions of the two magnet holes corresponding to each set of magnets, and an outer circumferential surface of the rotor core, and each end plate may have third holes disposed in portions of each end plate that face at least one bridge of the intermediate bridge and the two outer circumferential bridges.

According to the above configuration, in the configuration of forming a single magnetic pole by the two magnets arranged in a V-shape, it is possible to efficiently suppress magnetic-flux short-circuit, in combination with the end plates provided with the two magnet holes.

In the rotary electric-machine rotor of the present disclosure, each end plates may have the third holes disposed in respective portions that face the intermediate bridge and the two outer circumferential bridges.

According to the above configuration, it is possible to further suppress magnetic-flux short-circuit.

In the rotary electric-machine rotor of the present disclosure, the plurality of holes may be a plurality of slits, each of the plurality of slits has a long thin shape, each of the end plates may have a plurality of slit sets provided in the end surface of the each of the end plates facing the end surfaces of the magnets, each of the slit sets may include a plurality of the slits arranged on a straight line in a longitudinal direction of the slits, and positions of the slits in any one of the slit sets may be offset in the longitudinal direction from positions of the slits in an adjacent one of the slit sets.

According to the above configuration, when leakage magnetic-flux passes between the multiple slits, the path length of this magnetic-flux becomes longer, so that it is possible to more efficiently suppress the magnetic-flux short-circuit.

According to the rotary electric-machine rotor of the present disclosure, in the configuration that the magnets are inserted in the magnet holes of the rotor core, it is possible to eliminate necessity to use non-magnetic material for the end plates, while coping with both suppression of magnetic-flux leakage of the magnets and suppression of coming out of the magnets and the resin.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 10 is a view corresponding to FIG. 5, and an enlarged view of a part C, in another example of the embodiment according to the present disclosure; and FIG. 11 is a view corresponding to FIG. 5, in another example of the embodiment according to the present disclosure.

DETAILED DESCRIPTION OF EMBODIMENTS

Figure 1:
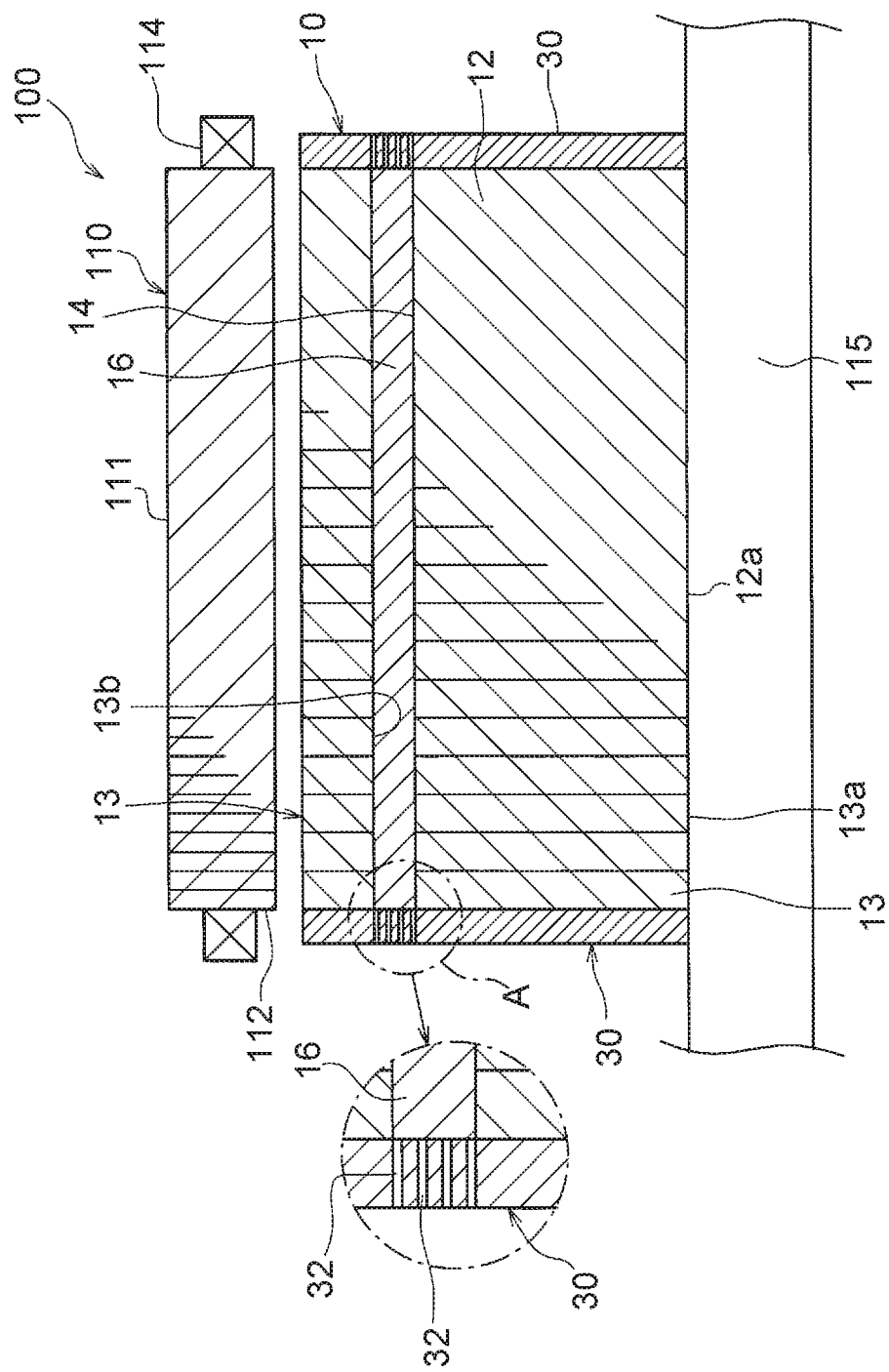
FIG. 1 is a half sectional view of a rotary electric machine including a rotary electric-machine rotor of an embodiment according to the present disclosure, and an enlarged view of a part A thereof.

Hereinafter, an embodiment of the present disclosure will be described with reference to drawings. Shapes, materials, and numbers described below are illustrative for the description, and they can be changed as appropriate depending on the specifications of a rotary electric-machine rotor. Equivalent elements will be denoted by the same reference numerals in all the following drawings. Furthermore, in the description in the text, it is assumed to use reference numerals mentioned earlier as needed.

Figure 2:
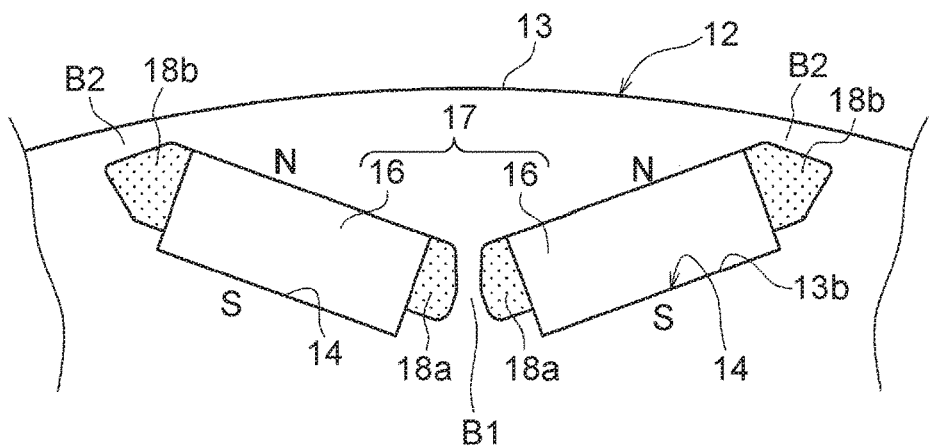
FIG. 2 is a view showing part of a rotor core and some of multiple magnets as viewed from one side of an axial direction, while an end plate is removed from the rotary electric-machine rotor of FIG. 1.

A right drawing in FIG. 1 is a half sectional view of a rotary electric machine 100 including a rotary electric-machine rotor 10 of the embodiment, and a left drawing in FIG. 1 is an enlarged view of a part A of the right drawing of FIG. 1. FIG. 2 is a view of part of a rotor core 12 and some of multiple magnets 16 as viewed from one side in the axial direction, while an end plate 30 is removed from the rotary electric-machine rotor 10. Hereinafter, the rotary electric-machine rotor 10 might be referred to as a rotor 10.

The rotor 10 is used for forming the rotary electric machine 100. The rotary electric machine 100 will be described with reference to FIG. 1. The rotary electric machine 100 is a permanent-magnet synchronous motor driven by three-phase alternating current. For example, the rotary electric machine 100 is used as a motor for driving a hybrid vehicle, as an electric power generator, or as a motor generator having the both functions.

The rotary electric machine 100 includes a stator 110, the rotor 10 disposed radially inward of the stator 110, and a rotary shaft 115. The stator 110 includes a substantially cylindrical stator core 111, and a stator coil 114 wound around multiple teeth 112 projecting from an inner circumferential surface of the stator core 111. The stator 110 is fixed to an inner side of a case (not illustrated).

The rotor 10 is a cylindrical member, and the rotor 10 in use is fixed while the rotary shaft 115 is inserted in the inside of the rotor 10. The rotor 10 in use is disposed inside the case. Inside the case, the rotor 10 is disposed radially inward of the stator 110 so as to face the stator 110. In this state, both end portions of the rotary shaft 115 are rotatably supported to the case through bearings (not illustrated). A gap in the radial direction is formed between an outer circumferential surface of the rotor 10 and an inner circumferential surface of the stator 110. With this configuration, the rotary electric machine is formed. In the following description, a "radial direction" denotes a direction of radiation from rotor 10, that is a radial direction of the rotor 10, and a "circumferential direction" denotes a direction along a circular shape defined around a central axis of the rotor 10. An "axial direction" denotes a direction along the central axis of the rotor 10.

The rotor 10 includes a rotor core 12, magnets 16 that are permanent magnets embedded at multiple positions in the circumferential direction of the rotor core 12, and two end plates 30. Specifically, the rotor core 12 is formed by stacking multiple first steel plates 13 made of magnetic material and having a circular plate-like shape in the axial direction. An axial hole 12a is formed at a center portion of the rotor core 12, and multiple magnet holes 14 are formed around the axial hole 12a. The rotary shaft 115 is fixed to the inner side of the axial hole 12a. The multiple magnet holes 14 are so formed as to extend in the axial direction at multiple positions located in the circumferential direction of the rotor core 12. A magnet 16 is inserted in each magnet hole 14 and is then fixed thereto. The two end plates 30 are placed at both sides of the rotor core 12 in such a manner that each end plate 30 faces the magnets 16 and resin portions 18a, 18b (FIG. 2) used for fixing the magnets 16. This configuration prevents the magnets 16 and the resin portions 18a, 18b from coming out in the axial direction. Portions of each end plate 30 that face the magnets 16 are formed with first pin-holes 32 (FIG. 3) described later. This configuration eliminates necessity of using non-magnetic material for the end plates 30, and also can cope with both suppression of magnetic flux leakage of the magnets 16 and suppression of coming out of the magnets 16 and the resin. This will be described later in detail.

Each of the first steel plates 13 included in the rotor core 12 has a disk shape, and is made of a silicon electromagnetic steel plate, for example. Each first steel plate 13 is formed by punching a thin steel sheet material having a thickness of 0.5 mm or less, for example, into an annular shape. Through this punching, each first steel plate 13 is formed with a shaft hole element 13a at a center portion thereof and multiple magnet hole elements 13b around this shaft hole element 13a.

The shaft hole elements 13a of the multiple first steel plates 13 are connected in the axial direction so as to form the axial hole 12a of the rotor core 12. The multiple magnet hole elements 13b of the multiple first steel plates 13 are connected in the axial direction so as to form the multiple magnet holes 14 extending in the axial direction in the rotor core 12.

As shown in FIG. 2, the multiple magnet holes 14 of the rotor core 12 are arranged such that each set includes two magnet holes 14, and the two magnet holes 14 of each set are combined into a V-shape opening toward the radially outward direction (upward direction in FIG. 2). The magnet 16 is inserted in each magnet hole 14. Each magnet 16 has a rectangular shape as viewed from one side of the axial direction, and is formed into a rectangular parallelepiped shape long in the axial direction. A rectangular parallelepiped space located in a circumferential middle portion of each magnet hole 14 and extending long in the axial direction is a magnet-insertion portion into which each magnet is inserted. In each magnet hole 14, the resin portions 18a, 18b spreading in the axial direction are disposed in at least part of gaps between the magnet hole 14 and the magnet 16. Specifically, immediately after the magnet 16 is inserted into the magnet-insertion portion of each magnet hole 14, gaps are formed at both ends of the magnet hole 14. These gaps are filled with resin as a magnet fixing material in a melted state, and the resin comes hardened, to thereby provide the resin portions 18a, 18b spreading in the axial direction. The magnets 16 are fixed relative to the rotor core 12 with these resin portions 18a, 18b. These resin portions 18a, 18b are hatched by dots in FIG. 2.

The magnetizing direction of each magnet 16 is a direction orthogonal to the outer circumferential surface and the inner circumferential surface. In the rotor 10, in a portion thereof shown in FIG. 2, each magnet 16 is magnetized such that part of each magnet 16 on the outer circumferential surface has an N-pole, and part of each magnet 16 on the inner circumferential surface has an S-pole. The resin with which the gaps of each magnet hole 14 are charged is heated, for example, to thereby fix the magnet 16 to the inside of the magnet hole 14. At this time, the rotor core 12 is heated by a heating unit (not illustrated). After the resin in a melted state is subjected to heating and hardening, the resin is cooled down to a normal temperature so as to be formed into the resin portions 18a, 18b.

The multiple magnets 16 are arranged such that each set includes two adjacent magnets 16, and each set of magnets 16 forms a single magnetic pole 17. Specifically, corresponding to the arrangement of the multiple magnet holes 14, the two magnets 16 in each set are arranged to face each other in a substantially V-shape having a wider distance therebetween toward the radially outward direction of the rotor core 12. In this manner, a single magnetic pole 17 is formed.

In addition, the rotor core 12 is formed with a single intermediate bridge B1 and two outer circumferential bridges B2, corresponding to each single set of magnets 16. The intermediate bridge B1 is a narrow-width magnetic flux path formed between both circumferential end portions of each two magnet holes 14 facing each other, corresponding to each set of magnets 16. The two outer circumferential bridges B2 are narrow-width magnetic flux paths formed between respective radially outer end portions of the two magnet holes 14 and the outer circumferential surface of the rotor core 12, corresponding to each set of magnets 16.

With reference to FIG. 1 again, the two end plates 30 are stacked on the both axial end surfaces of the rotor core 12, and the rotor core 12 is held between the two end plates 30. The end plates 30 may be fixed to the rotor core by providing the rotary shaft 115 with interferences and fixing the end plates 30 to the rotary shaft 115, or by pressing the both axial end surfaces of the end plates, while the end plates are stacked on the rotor core 12, by a swaging tool in the axial direction so as to form swaged portions to the end plates 30. Through this, the two end plates 30 are disposed at the both axial end surfaces of the rotor core 12 while the end plates 30 oppose each other.

Figure 3:
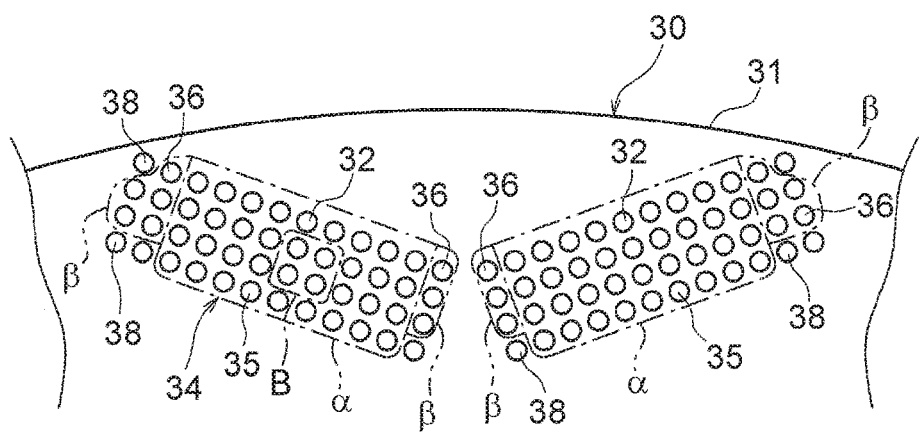
FIG. 3 is a view showing part of the end plate included in the rotary electric-machine rotor of FIG. 1, as viewed from one side of the axial direction.
Figure 4:
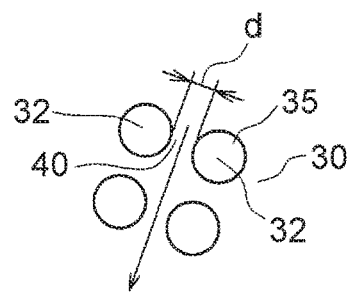
FIG. 4 is an enlarged view of a part B of FIG. 3.
Figure 5:
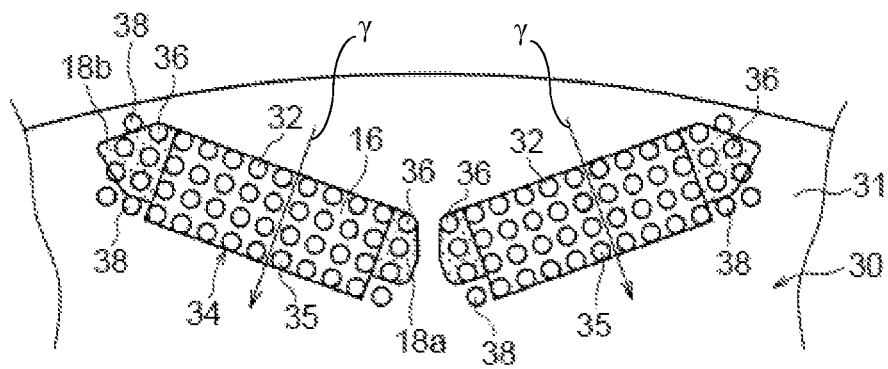
FIG. 5 is a perspective view showing part of the rotary electric-machine rotor of the embodiment according to the present disclosure, as viewed from one side of the axial direction.

FIG. 3 is a view showing part of each end plate 30 as viewed from one side of the axial direction. FIG. 4 is an enlarged view of a part B of FIG. 3. FIG. 5 is a perspective view showing part of the rotor 10 as viewed from one side of the axial direction. Each arrow in the drawings indicates leakage magnetic-flux leaking out to each end plate 30 side.

The end plates 30 are members of magnetic material. Specifically, the end plates 30 are formed by second steel plates 31 in a disk shape. Each second steel plate 31 is formed by the same material and has the same thickness as those of the first steel plates 13 included in the rotor core 12. Through this configuration, the end plates 30 and the first steel plates 13 of the rotor core 12 can be formed by punching a steel sheet material of the same material with the same thickness. Accordingly, it is possible to reduce the manufacturing cost of the rotor 10 by reduction of material cost and the number of process. For example, it is possible to reduce the manufacturing cost by forming the first steel plates 13 and the second steel plates 31 at the same time by punching a single steel sheet material.

Each end plate 30 is formed with at least one leakage magnetic-flux suppressing hole (hole) in portions of each end plate 30 that face the magnets 16. In the present embodiment, each end plate 30 is formed with multiple first pin-holes 32, as at least one leakage magnetic-flux suppressing hole, in the portions of each end plate 30 that face the magnets 16.

Specifically, each end plate 30 is formed with V-shaped hole groups 34 at multiple positions in the circumferential direction of the end plate 30. Each V-shaped hole group 34 is formed by arranging two pin-hole groups 35 in a V-shape, corresponding to the arrangement positions of the magnet holes 14 (FIG. 2) in a V-shape of the rotor core 12. Each pin-hole group 35 is formed by aligning pin-holes that are multiple fine circular holes in a rectangular region. Specifically, each pin-hole group 35 includes multiple first pin-holes 32, multiple second pin-holes 36, and multiple third pin-holes 38. The multiple first pin-holes 32 are formed in an intermediate portion in the longitudinal direction of each pin-hole group 35, the intermediate portion being a portion of the end plate 30 (each part surrounded by a one-dot chain line α in FIG. 3) facing the magnets 16 (FIG. 2). The multiple second pin-holes 36 are formed in both end portions in the longitudinal direction of each pin-hole group 35, which are portions of the end plate 30 (each part surrounded by a two-dot chain line β in FIG. 3) that face the resin portions 18a, 18b (FIG. 2). The multiple third pin-holes 38 are formed in the both end portions in the longitudinal direction of each pin-hole group 35, and in a portion of the end plate 30 facing none of the magnets 16 and the resin portions 18a, 18b. In the present embodiment, the first pin-holes 32 are equivalent to the leakage magnetic-flux suppressing holes, and the second pin-holes 36 are equivalent to second leakage magnetic-flux suppressing holes (second holes).

The multiple pin-holes 32, 36, 38 included in each pin-hole group 35 are arranged such that the multiple pin-holes are aligned in the longitudinal direction of the pin-hole group 35 and also in a width direction orthogonal to the longitudinal direction. Each of the pin-holes 32, 36, 38 extends through the end plate 30 in the axial direction, and all of the pin-holes 32, 36, 38 have the same diameters. Through this configuration, portions of the end plates 30 where the pin-holes 32, 36, 38 are formed are mesh-patterned. The pin-holes 32, 36, 38 are formed by punching the end plate 30 in the axial direction at multiple positions using multiple hole-punches (not illustrated).

Portions of each end plate 30 where no pin-holes 32, 36, 38 are formed cover the axial end surfaces of the magnets 16 and the axial end surfaces of the resin portions 18a, 18b. Hereinafter, the resin portions 18a, 18b are appropriately referred to collectively as the "resin portions 18".

As shown in FIG. 4, in each pin-hole group 35, inter-hole magnetic-flux paths 40 are formed between respective adjacent pin-holes 32, 36, 38. When using, the inter-hole magnetic-flux paths 40 are paths through which leakage magnetic-flux leaking out from the magnets 16 to each end plate 30 might pass. An arrow indicates leakage magnetic-flux.

According to the above rotor 10, since the first pin-holes 32 are formed in the end plates 30 made of magnetic material in a manner as to face the magnets 16, a space having a great magnetic resistance is formed inside each first pin-hole 32 of each end plate 30, to thus hinder the magnetic flux from flowing through the end plates 30. Accordingly, it is possible to suppress both magnetic-flux leakage leaking out from the magnets 16 to the end plates 30 and magnetic-flux short-circuit of the magnets 16 through the end plates 30. The end plates 30 cover the axial end surfaces of the magnets 16 and the axial end surfaces of the resin portions 18. Through this, it becomes unnecessary to use non-magnetic material for the end plates 30, and it is also possible to cope with both suppression of the magnetic-flux leakage of the magnets 16 and suppression of coming out of the magnets 16 and the resin. If the end plates 30 do not face the resin portions 18, part of the resin portions 18 might come out to the outside if cracking is caused to the resin portions 18. In the present embodiment, it is possible to suppress coming out of the resin even when resin cracking occurs. Because magnetic-flux leakage can be suppressed without using non-magnetic material for the end plates 30, it becomes easier to promote cost reduction of the end plates 30. In addition, it is possible to suppress magnetic-flux leakage and magnetic-flux short-circuit, to thus allow more magnetic-flux coming out from the magnets 16 to flow toward the stator. Accordingly, it is possible to suppress decrease of torque and increase in loss of the torque in the rotary electric machine 100.

The multiple first pin-holes 32 are formed in the portions of the end plates 30 that face the magnets 16. Through this, it is possible to increase a proportion of the first pin-holes 32 per unit area of the end plates 30, and reduce the size of each first pin-hole 32, to thereby increase a total number of the first pin-holes 32. Hence, it is possible to cope with both suppression of magnetic-flux leakage and suppression of coming out of the magnets 16 at a high degree because more spaces can be secured in the portions facing the magnets. In addition, each first pin-hole 32 is a circular hole, and thus the size of each first pin-hole 32 can be easily smaller.

In addition, the multiple second pin-holes 36 are formed in the portions of the end plates 30 that face the resin portions 18. Through this, the proportion of the second pin-holes 36 per unit area of the end plates 30 can be increased, and the size of each second pin-hole 36 can be smaller, to thus increase the total number of the second pin-holes 36. Accordingly, it is possible to cope with both suppression of leakage magnetic-flux flowing through the portions of the end plates 30 facing the resin portions 18 and suppression of coming out of the resin due to cracking of the resin portions 18.

In the above description, the case of forming each of the pin-holes 32, 36, 38 to be a circular hole has been described, but each pin-hole may be formed to be a non-circular hole such as a rectangular shape.

In the embodiment, the multiple pin-holes 32, 36, 38 are formed, each pin-hole distance d (FIG. 4) equivalent to a width of each inter-hole magnetic-flux path 40 is reduced, to thereby suppress magnetic-flux leakage, and also suppress magnetic-flux short-circuit caused by short-circuit caused by magnetic-flux flowing through the inter-hole magnetic-flux paths 40 without passing through the stator 110 (FIG. 1). Preferably, each pin-hole distance d is restricted to a predetermined range, that is, to a range of twice to six times as great as the thickness of each second steel plate 31 included in each end plate 30. By restricting the pin-hole distance d to not more than six times as great as the thickness of each second steel plate 31, when the pin-holes 32, 36, 38 are formed through punching, it is possible to greatly deteriorate the magnetic characteristic of the end plates 30 in the inter-hole magnetic-flux paths 40. Accordingly, leakage magnetic-flux becomes more difficult to pass through the inter-hole magnetic-flux paths 40; thus it is possible to enhance effect to suppress magnetic-flux short-circuit.

Figure 6:
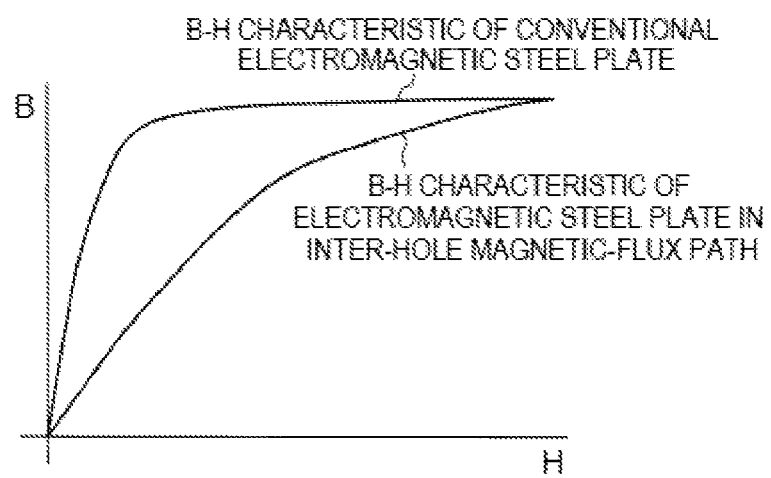
FIG. 6 is a drawing showing a B-H characteristic of a conventional electromagnetic steel plate, and a B-H characteristic of an electromagnetic steel plate in an inter-hole magnetic-flux path when a pin-hole distance is restricted to a predetermined range in the embodiment.

FIG. 6 is a drawing showing a B-H characteristic representing a relation between a magnetic field H and a magnetic-flux density B of a conventional electromagnetic steel plate, and a B-H characteristic of the second steel plate 31, which is an electromagnetic steel plate in the inter-hole magnetic-flux paths 40 when the pin-hole distance d is restricted to the above predetermined range in the embodiment. As shown in FIG. 6, a B-H characteristic is represented by a relation between a magnetic field H and a magnetic-flux density B of a steel plate magnetized by this magnetic field H. Compared with the B-H characteristic in the conventional electromagnetic steel plate, in the B-H characteristic of the embodiment in which the pin-hole distance d is restricted within the predetermined range, increase of the magnetic-flux density B relative to increase of the magnetic field H becomes more moderate, particularly in a region of a smaller magnetic field, and magnetic permeability becomes smaller. Accordingly, it is seen that by restricting the pin-hole distance d to the predetermined range, it is possible to promote the effect to suppress the magnetic-flux short-circuit.

In addition, by defining the pin-hole distance d to be not less than twice as great as the thickness of each second steel plate 31, it is possible to sufficiently enhance accuracy of the shape of each of the pin-holes 32, 36, 38.

Figure 7:
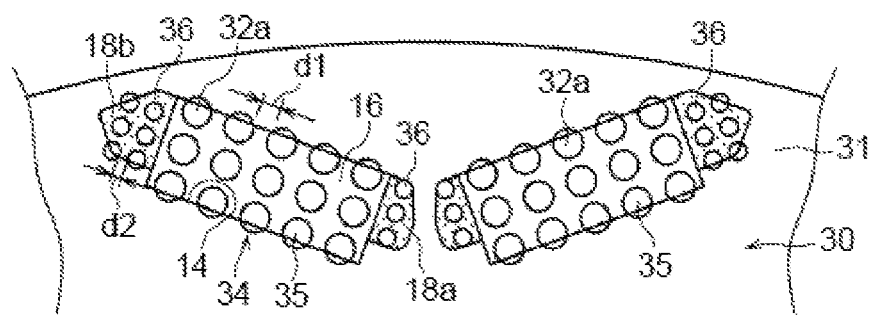
FIG. 7 is a view corresponding to FIG. 5, in another example of the embodiment according to the present disclosure.

FIG. 7 is a view corresponding to FIG. 5, in another example of the embodiment. In the configuration of this example, compared with the configuration shown in FIG. 1 to FIG. 5, a diameter that is a maximum inner length of each first pin-hole 32a formed in each end plate 30 is set to be greater. A diameter that is a maximum inner length of each second pin-hole 36 is set to be smaller than the diameter of each first pin-hole 32a. In the configuration of FIG. 7, illustration of the third pin-holes 38 (see FIG. 5) is omitted, but the third pin-holes may be formed.

In each end plate 30, a distance d1 between each two adjacent first pin-holes 32a in the longitudinal direction of each pin-hole group 35 is greater than a distance d2 between each two adjacent second pin-holes 36 in the longitudinal direction of each pin-hole group 35.

According to the above configuration, it is possible to suppress coming out of the resin due to cracking of the resin portions 18, suppress the number of hole-punches for the first pin-holes 32a, and also suppress magnetic-flux leakage. To the contrary, different from the embodiment, in the configuration that each end plate 30 does not face the resin portions 18, if resin cracking occurs, small pieces of the resin might come out from the magnet holes 14. Hence, it is preferable to form the second pin-holes 36 to be as small as possible in the portions of the end plates 30 facing the resin portions 18, for the purpose of suppressing coming out of the resin. In the meantime, possibility of coming out of the magnets 16 due to magnet cracking is much smaller than that in the case of the resin portions 18. Hence, in light of suppressing coming out of the magnets 16, the size of each of the first pin-holes 32a facing the magnets 16 may be relatively large based on the assumption that the shape of each first pin-hole 32a facing each magnet 16 is formed to be smaller than the shape of the axial end surface of the magnet 16. Since each first pin-hole 32a can be relatively large, it is possible to suppress the total number of hole-punches for the first pin-holes 32a, while securing the proportion of the first pin-holes 32a per unit area that is necessary for suppressing magnetic-flux leakage. Accordingly, it becomes easier to reduce machining cost of the end plates 30.

In each end plate 30, the distance d1 between each two adjacent first pin-holes 32a in the longitudinal direction of each pin-hole group 35 is greater than the distance d2 between each two adjacent second pin-holes 36 in the longitudinal direction of each pin-hole group 35. Accordingly, it is possible to increase strength in the portions of each end plate 30 that face the magnets 16 and might be pushed by the magnets 16, and also to enhance effect to suppress magnetic-flux leakage in the portions facing the resin portions 18, which are not required to have a high strength. The other configurations and operation are the same as the configuration of FIG. 1 to FIG. 5. Instead of restricting the relations of the distances d1 and d2, or in combination with this, relations of distances between the adjacent pin-holes in other directions may be restricted. For example, in each end plate 30, a distance between each two adjacent first pin-holes 32a in a direction orthogonal to the longitudinal direction of each pin-hole group 35 may be greater than a distance between each two adjacent second pin-holes 36 in the direction orthogonal to the longitudinal direction of each pin-hole group 35. In the configuration of FIG. 7, there may be provided either a configuration that the diameter of each second pin-hole is smaller than the diameter of each first pin-hole or a configuration that the distance d1 between the first pin-holes may be greater than the distance d2 between the second pin-holes.

Figure 8:
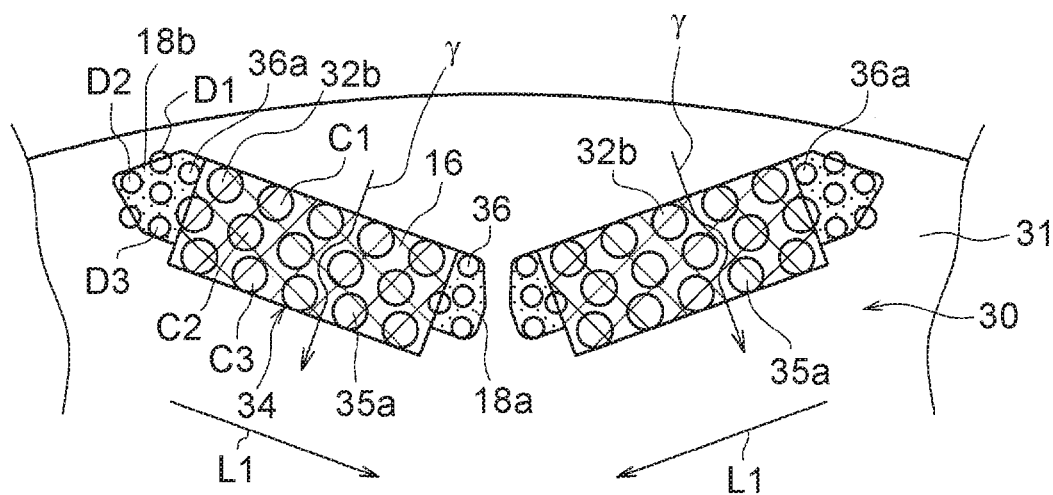
FIG. 8 is a view corresponding to FIG. 5, in another example of the embodiment according to the present disclosure.

FIG. 8 is a view corresponding to FIG. 5, in another example of the embodiment. In the configuration of the present example, different from the configuration shown in FIG. 7, the multiple first pin-holes 32*b* are arranged in a so-called alternating pattern. Specifically, the multiple first pin-holes 32*b* are arranged such that the first pin-holes 32*b* face the axial end surfaces of the magnets 16 faced by the first pin-holes 32*b*, and are aligned on a straight line in a longitudinal direction L1 so as to form each single pin-hole set C1, C2, C3 in each rectangular region (each part indicated by inclined grids in FIG. 8) that corresponds to the shape of the axial end surface of each magnet 16. The multiple pin-hole sets C1, C2, C3 are arranged in multiple rows in a direction orthogonal to the longitudinal direction. In each pin-hole set C1, C2, C3, the multiple first pin-holes 32*b* are arranged with almost equal intervals. In addition, in the multiple pin-hole sets C1, C2, C3, the positions in the longitudinal direction L1 of the first pin-holes 32*b* deviate from each other between the adjacent pin-hole sets C1, C2, C3. Consequently, the multiple first pin-holes 32*b* are arranged in the alternating pattern.

The multiple second pin-holes 36*a* located at the radially outer end portions of each pin-hole group 35*a* are arranged in multiple pin-hole sets D1, D2, D3 along the directions of the multiple pin-hole sets C1, C2, C3. The positions in the longitudinal direction L1 of the second pin-holes 36*a* deviate from each other between the adjacent pin-hole sets D1, D2, D3.

According to the above configuration, the distance between the adjacent first pin-holes 32*b* can be reduced among the adjacent pin-hole sets C1, C2, C3. Accordingly, the pin-hole distance between the first pin-holes 32*b* can easily be restricted to the range of twice to six times as great as the thickness of each second steel plate 31. Consequently, when the first pin-holes 32*b* are formed by punching, the magnetic characteristic between the first pin-holes 32*b* can easily be deteriorated. In addition, in each end plate 30 as indicated by an arrow γ in FIG. 8, each path of magnetic-flux leakage passing through between the multiple first pin-holes 32*b* becomes a path in a non-linear state that is bent at multiple bent portions. Hence, in each end plate 30, it is possible to increase each path length of the leakage magnetic-flux passing through between the multiple first pin-holes 32*b*. Accordingly, it is possible to further suppress occurrence of magnetic-flux short-circuit via the end plates 30, to thus further suppress decrease of torque and increase in loss of the torque of the rotary electric machine.

In addition, in the multiple second pin-holes 36*a* disposed in the radially outer end portions of each pin-hole group 35*a*, it is also possible to reduce the distance between each two adjacent second pin-holes 36*a*, as with the case of the first pin-holes 32*b*. Hence, the magnetic characteristic between the second pin-holes 36*a* can easily be deteriorated, and each path length of the leakage magnetic-flux can be increased; therefore, it is possible to further suppress occurrence of magnetic-flux short-circuit via the end plates 30. The other configuration and operation are the same as the configuration shown in FIG. 7. As the configuration shown in FIG. 1 to FIG. 5, the configuration of the present example may be combined with the configuration that the first pin-holes and the second pin-holes are set to have the same sizes.

Figure 9:
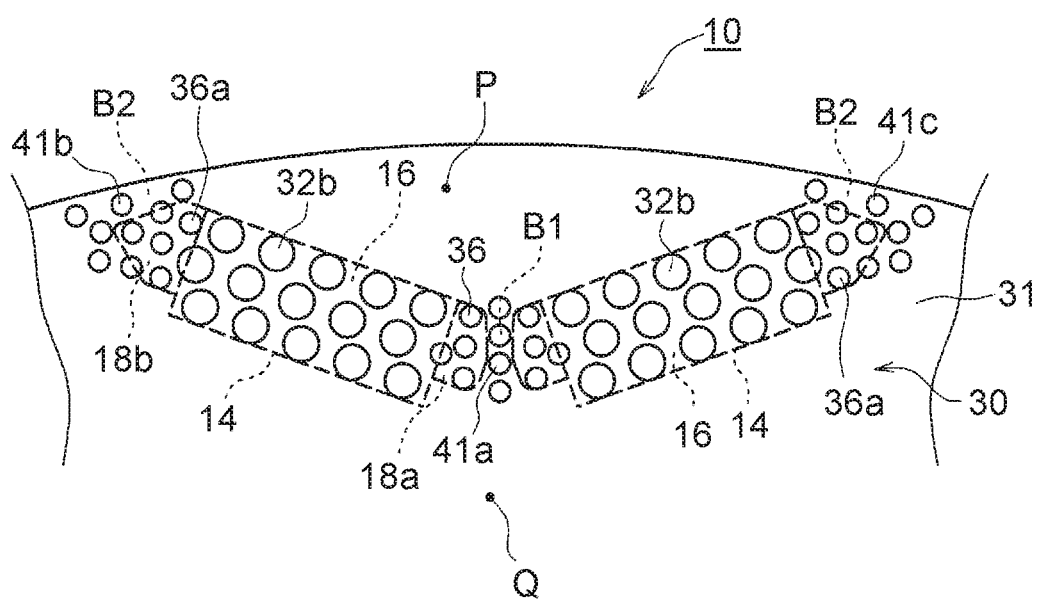
FIG. 9 is a view showing part of the rotary electric-machine rotor as viewed from one side of the axial direction, in another example of the embodiment according to the present disclosure.

FIG. 9 is a view showing part of the rotor 10 as viewed from one side of the axial direction, in another example of the embodiment. In the configuration of the present example, each end plate 30 in the configuration shown in FIG. 8 is further formed with multiple fourth pin-holes 41*a*, 41*b*, 41*c*. Specifically, in each end plate 30, corresponding to each set of multiple sets of the magnet holes 14 of the rotor core 12 (FIG. 2), portions of the end plate 30 that face the one intermediate bridge B1 and the two outer circumferential bridges B2 are respectively formed with one or more fourth pin-holes 41*a*, 41*b*, 41*c*. The fourth pin-holes 41*a*, 41*b*, 41*c* are equivalent to third leakage magnetic-flux suppressing holes (third holes). For example, two or more fourth pin-holes 41*a* are aligned in the radial direction in the portion of each end plate 30 that faces the intermediate bridge B1, and one or more fourth pin-holes 41*b*, 41*c* are arranged in the portions of each end plate 30 that face the outer circumferential bridges B2.

According to the above configuration, in the configuration that each single magnetic pole is formed by the two magnets 16 arranged in a V-shape, it is possible to efficiently suppress magnetic-flux short-circuit, in combination with the configuration that the end plates have the first pin-holes 32*b* and the second pin-holes 36*a*. Only single fourth pin-hole 41*a*, 41*b*, 41*c* may be formed in the respective portions facing one intermediate bridge B1 and two outer circumferential bridges B2 that correspond to each set. The fourth pin-holes may be formed only in portions of each end plate 30 that face any one or two bridges of one intermediate bridge B1 and two outer circumferential bridges B2 that correspond to each set. In this case, compared with the configuration of FIG. 8, it is possible to more efficiently suppress magnetic-flux short-circuit. In the meantime, as the configuration of FIG. 9, it is more preferable to form the fourth pin-holes 41*a*, 41*b*, 41*c* in respective portions of each end plate 30 that face one intermediate bridge B1 and two outer circumferential bridges B2. In this more preferable configuration, leakage magnetic-flux leaking out to a portion of each end plate 30 that faces the radially outer sides of the two magnets 16 in each set of the rotor core (e.g., portion indicated by a point P in FIG. 9) becomes difficult to flow to a portion of each end plate 30 that faces the radially inner sides of these two magnets 16 (e.g., portion indicate by a point Q in FIG. 9). Through this, it is possible to further suppress magnetic-flux short-circuit. The other configuration and operation are the same as the configuration shown in FIG. 8. The configuration of the present example may be combined with the configuration shown in FIG. 1 to FIG. 5, or the configuration shown in FIG. 7.

An upper drawing of FIG. 10 is a view corresponding to FIG. 5 in another example of the embodiment, and a lower drawing of FIG. 10 is an enlarged view of a part C of the upper drawing of FIG. 10. In the configuration of the present example, different from the respective configurations of the above examples, the end plates 30 are formed with slits 44 that are multiple long thin holes as multiple leakage magnetic-flux suppressing holes. Specifically, V-shaped hole groups 42 are formed at multiple positions in the circumferential direction of each end plate 30. In each V-shaped hole group 42, two slit groups 43 are arranged in a V-shape corresponding to the arrangement positions of the magnet holes 14 arranged in a V-shape of the rotor core 12 (FIG. 2). Each slit group 43 includes multiple slits 44, and the respective slits 44 are formed in portions of each end plate 30 that face the magnets 16.

In each slit group 43, the multiple slits 44 are aligned on a straight line in a longitudinal direction L2 so as to constitute respective single slit sets E1, E2 to E6. The multiple slit sets E1, E2 to E5 are arranged in multiple rows in a direction orthogonal to the longitudinal direction L2, and respective positions in the longitudinal direction of the slits 44 between adjacent slit sets E1, E2 to E6 deviate from each other. Accordingly, magnetic-flux paths T formed between the adjacent slits 44 in the longitudinal direction of the respective slit sets E1, E2 to E6 are arranged at different positions in a direction parallel to the straight lines on which the slits 44 are located, between the adjacent slits sets E1, E2 to E6. Respective lengths along the straight lines of the multiple slits 44 are substantially the same. Some slits 44 of the multiple slits 44 are disposed in portions of each end plate 30 that face the resin portions 18. The slits 44 are formed by punching using hole-punches, as with the case of the pin-holes in the respective configuration of the above examples.

According to the above configuration, as with the respective configurations of the above examples, the slits 44 are formed in the end plates 30 made of magnetic material, to thereby suppress magnetic-flux leakage leaking out from the magnets 16 to the end plates 30 as well as magnetic-flux short-circuit. In addition, the end plates 30 cover the axial end surfaces of the magnets 16 and the axial end surfaces of the resin portions 18. Through this, it becomes unnecessary to use non-magnetic material for the end plates 30, and it is also possible to cope with both suppression of the magnetic-flux leakage of the magnets 16 and suppression of coming out of the magnets 16 and the resin.

Further, as indicated by broken lines in FIG. 10, when leakage magnetic-flux flows through between the multiple slits 44, the paths of the magnetic-flux are interrupted and bent by the slits 44 located ahead of the flowing direction of this magnetic-flux. Accordingly, since the path length of the leakage magnetic-flux becomes longer, it is possible to more efficiently suppress magnetic-flux short-circuit. The other configurations and operation are the same as the configuration of FIG. 1 to FIG. 5.

In FIG. 11, in the configuration shown in FIG. 10, as with the configuration of FIG. 8, the portions of the end plates 30 that face the resin portions 18 are formed with multiple second pin-holes 36a. In addition, a length in a longitudinal direction L3, which is a maximum length of each slit 44 is greater than a diameter of each second pin-hole 36a. The multiple second pin-holes 36a face the resin portions 18. Hence, it becomes easier to suppress coming out of the resin due to resin cracking of the resin portions 18. As with the configuration of FIG. 7, it is possible to promote suppression of coming out of the resin, and reduction of the number of hole-punches for the slits 44, as well as suppression of magnetic-flux leakage. The other configuration and operation are the same as the configuration of FIG. 8 and the configuration of FIG. 10.

In the respective configurations of the above examples, there has been described the case in which the portions of the end plates 30 that face the magnets 16 are formed with the multiple first pin-holes or the multiple slits, but only one first pin-hole or only one slit may be formed in a portion of each end plate 30 that faces one magnet 16. In addition, in the respective configuration of the above examples, as the end plates 30, it may not be always necessary to use the second steel plate made of the same material and having the same thickness as those of the first steel plates 13 of the rotor core 12. For example, as the second steel plates, there may be used plates whose magnetic characteristic is inferior to that of the first steel plates 13, or plates each having a greater thickness than that of each first steel plate 13, or plates formed by metallic magnetic material other than steel.

In addition, in the respective configurations of the above examples, there has been described the case in which the rotor core 12 is configured by stacking the multiple first steel plates 13, but the rotor core is not limited to this configuration. For example, the rotor core may be formed by pressure-molding both resin binder and magnetic powder. In the meantime, in light of cost reduction, as with the above respective examples, it is preferable that the rotor core 12 is formed by a stacked body of the first steel plates 13, and the end plates 30 are formed by the second steel plates whose material and thickness are the same as those of the first steel plates 13.

In addition, in the respective configurations of the above examples, there has been described the case in which the two magnets 16 are arranged in a V-shape, but there may be employed such a configuration that the respective magnets are arranged in a linear direction along the circumferential direction.

What is claimed is:

1. A rotary electric-machine rotor comprising:
a rotor core made of magnetic material, the rotor core having magnet holes extending in an axial direction of the rotary electric-machine rotor;
magnets disposed in the magnet holes;
resin portions disposed in at least part of gaps between the magnet holes and the magnets, the resin portions extending in the axial direction; and
end plates disposed adjacent to end surfaces in an axial direction of the rotor core, wherein
the end plates are members made of magnetic material, the end plates cover end surfaces of the magnets in the axial direction and end surfaces of the resin portions in the axial direction, and
each of the end plates have at least one hole disposed in a position that faces at least one part of the end surfaces of the magnets
wherein
at least one of the holes is a plurality of holes, each of the end plates has the plurality of holes disposed in an end surface of each of the end plates facing the end surface of the magnets,
the plurality of holes are a plurality of pin-holes, each of the plurality of pin-holes has a round shape,
each the end plates has a plurality of pin-hole sets provided in a rectangular region facing the end surfaces of the magnets,
each of the pin-hole sets includes the plurality of the pin-holes arranged on a straight line in a longitudinal direction of the rectangular region, and
positions of the pin holes in any one of the pin-hole set are offset in the longitudinal direction from positions of the pin-holes in an adjacent one of the pin-holes sets.

2. The rotary electric-machine rotor according to claim 1, wherein
each of the end plates and the rotor core are made of the same kind of magnetic material, and have the same thickness.

3. The rotary electric-machine rotor according to claim 1, wherein
each end plate has a plurality of second holes disposed in the end surface of each of the end plates facing an end surface of the resin portions in the axial direction.

4. The rotary electric-machine rotor according to claim 3, wherein
a maximum inner length of each of the plurality of second holes is smaller than a maximum inner length of each of the plurality of holes.

5. The rotary electric-machine rotor according to claim 3, wherein
a distance between the holes adjacent to each other is greater than a distance between the second holes adjacent to each other.

6. The rotary electric-machine rotor according to claim 3, wherein
two magnet holes adjacent to each other a circumferential direction are arranged in a V-shape such that a distance between the two magnet holes in the circumferential direction increases outward in a radial direction,
the rotor core includes an intermediate bridge between end portions in a circumferential direction of the two magnet holes corresponding to each set of magnets, and two outer circumferential bridges between respective radially outer end portions of the two magnet holes corresponding to each set of magnets, and an outer circumferential surface of the rotor core, and
each end plate has third holes disposed in portions of each end plate that face at least one bridge of the intermediate bridge and the two outer circumferential bridges.

7. The rotary electric-machine rotor according to claim 6, wherein
each end plate has the third holes disposed in respective portions that face the intermediate bridge and the two outer circumferential bridges.

8. A rotary electric-machine rotor comprising:
a rotor core made of magnetic material, the rotor core having magnet holes extending in an axial direction of the rotary electric-machine rotor;
magnets disposed in the magnet holes;
resin portions disposed in at least part of gaps between the magnet holes and the magnets, the resin portions extending in the axial direction; and
end plates disposed adjacent to end surfaces in an axial direction of the rotor core, wherein
the end plates are members made of magnetic material, the end plates cover end surfaces of the magnets in the axial direction and end surfaces of the resin portions in the axial direction, and
each of the end plates have at least one hole disposed in a position that face at least one part of the end surfaces of the magnets,
wherein
at least one of the holes is a plurality of holes, each of the end plates has the plurality of holes disposed in an end surface of each of the end plates facing the end surface of the magnets,
the plurality of holes are a plurality of slits, each of the plurality of slits has a long thin shape,
each of the end plates has a plurality of slit sets provided in the end surface of the each of the end plates facing the end surfaces of the magnets,
each of the slit sets includes a plurality of the slits arranged on a straight line in a longitudinal direction of the slits, and
positions of the slits in any one of the slit sets are offset in the longitudinal direction from positions of the slits in an adjacent one of the slit sets.

* * * * *